US005472656A

United States Patent [19]

Wheatley et al.

[11] Patent Number: 5,472,656

[45] Date of Patent: Dec. 5, 1995

[54] METHOD OF MANUFACTURING LAMPSHADES AND APPARATUS FOR PERFORMING THE METHOD

[75] Inventors: Jeremy D. Wheatley, St. Albans; Andrew C. Diamond, Welwyn Garden City, both of United Kingdom

[73] Assignee: Welwyn Lighting Designs Limited, Hertfordshire, United Kingdom

[21] Appl. No.: 139,572

[22] Filed: Oct. 19, 1993

[30] Foreign Application Priority Data

Oct. 30, 1992 [GB] United Kingdom .................. 9222815

[51] Int. Cl.$^{6}$ .................................................. B29C 53/84

[52] U.S. Cl. .......................... 264/295; 264/296; 264/322; 362/351; 362/358; 362/361

[58] Field of Search .................................. 362/351, 352, 362/358, 361, 458; 264/295, 296, 322, 339; 425/403

[56] References Cited

U.S. PATENT DOCUMENTS

| | | | |
|---|---|---|---|
| 3,484,518 | 12/1969 | Ignell | 264/322 |
| 4,867,929 | 9/1989 | Albrecht et al. | 264/296 |
| 4,896,415 | 1/1990 | Bock | 264/296 |

FOREIGN PATENT DOCUMENTS

| | | | |
|---|---|---|---|
| 2011615 | 1/1987 | Japan | 264/322 |

*Primary Examiner*—Ira S. Lazarus
*Assistant Examiner*—Alan B. Cariaso
*Attorney, Agent, or Firm*—Webb Ziesenheim Bruening Logsdon Orkin & Hanson

[57] ABSTRACT

A lampshade is manufactured from heat deformable sheet material by forming a blank of the sheet material, in the shape of a sector of an annulus, into a hollow truncated cone having upper and lower peripheral edges. The overlapping edges of the blank are temporarily tacked together and the blank supported by an apparatus which engages the interior of the conical blank, which apparatus includes a former for engagement with the interior surface of the blank adjacent the upper and lower peripheral edges thereof so that marginal edge portions of the blank project beyond the formers. Heating means heat the marginal edge portions and upper and lower die members engage the heated and softened marginal edge portions to fold or roll the deformable sheet material around the edge portions of the formers and thereafter hold the formed edge portions in place until the material has cooled. The edge portions of the formers have the form of rounded beads so that the edge portions of the material deformed therearound have the form of incompletely closed cavities or pockets. The workpiece is removed from the apparatus after separating the temporary tack welds joining the ends of the blank, the product removed from the apparatus, and a mounting bracket having a peripheral ring is fitted with the peripheral ring being pushed into the annular channel at the respective rolled-over edge of the shade, after which the straight edges of the shade material are re-united by a permanent weld to complete the shade.

13 Claims, 11 Drawing Sheets

METHOD OF MANUFACTURING LAMPSHADES AND APPARATUS FOR PERFORMING THE METHOD

This invention relates to the manufacture of lampshades, more particularly for the manufacture of lampshades of a heat-deformable sheet material or fabric secured to a mounting frame adapted to be fitted, for example, to a standard electric lamp socket. Such a lampshade is herein referred to as being "of the kind specified".

Figure 1:
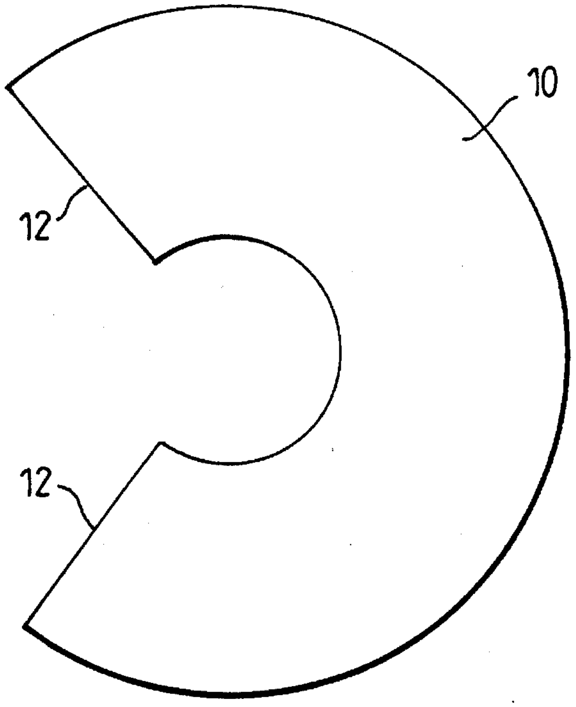
Figure 2:
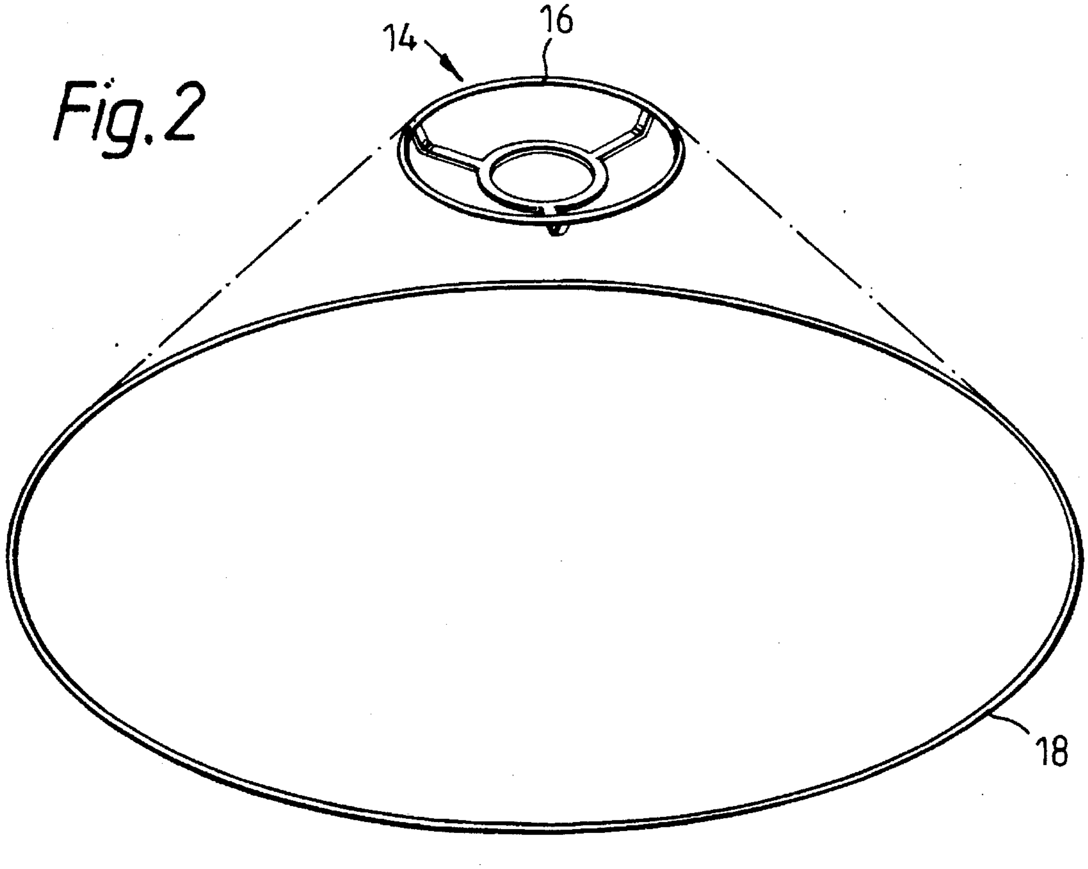

It is known to manufacture lampshades of the kind specified, using a lampshade material which comprises a decorative fabric adhered to a plastics backing sheet which lends dimensional stability and stiffness to the fabric and facilitates handling during manufacture. Referring to FIGS. 1 and 2, in manufacture, an arcuate panel 10 of such material is cut (see FIG. 1) and bent into frustoconical form so that the ends 12 of the panel arc meet, these ends being then secured together, for example by stitching, welding or adhesive tape to form a hollow truncated cone 20 indicated by broken lines in FIG. 2. The mounting frame 14 (illustrated in perspective in FIG. 2), which has an outer annular ring 16, for example of round metal wire, is then secured to the truncated cone at or adjacent the upper, smaller-diameter end. A similar wire ring 18 may be secured at the lower or wider end of the cone 20.

In one known method of manufacture, the upper and lower edges of the truncated cone 20 are secured to the wire rings 16, 18 by means of adhesive tape extended around the upper and lower edge regions of the hollow truncated cone and stuck thereto so as to extend laterally beyond the respective edges of the truncated cone, and such tape is folded lengthwise around the respective rings 16, 18 to engage the inner surface of the truncated cone adjacent the respective edge and is likewise adhered to the inner surface of the shade material. The last-noted procedure is generally carried out manually, but is relatively straightforward. This technique has the disadvantage of inevitably leaving the fastening tape to view and, unless the free edges of the fastening tape on the inside and outside of the shade happen to be in exact register on the inner and outer side of the shade material, something which it is almost impossible to ensure manually in practice, the inner portion of the tape is likewise rendered visible, as a shadow, on the shade material, when the shade is in use, detracting from the appearance of the shade.

In another known method of manufacture the upper edge region of the cone is folded over around the wire ring 16 and is either adhesively secured to the wire ring 16 itself or, on the inside of the shade, is stuck to the inner surface of the shade material. This other procedure, which is also carried out manually, avoids the need to have visible securing tape, but is somewhat more involved. Thus, because the plastics film backing the fabric is so effective in dimensionally stabilising the fabric, folding of the fabric around the rings 16, 18 is not readily possible unless the plastics film is removed from the portion to be folded around the respective wire frame 16, 18. Accordingly, localised removal of the plastics backing is necessary. However, it is not possible merely to remove a border region of the plastics backing extending to the respective free arcuate edge of the fabric panel, since such removal would permit fraying of the fabric. Instead, it is necessary to remove an arcuate band of the plastics backing adjoining and paralleling the respective free arcuate edge but spaced slightly therefrom to leave intact a thin band of plastics material at the free edge to prevent such fraying. Thus, this technique is particularly expensive. The last-mentioned technique also has the disadvantage that, if not carried out with sufficient skill, the free edges of the fabric within the lampshade extend beyond the respective wire frames 16, 18 and cast discernible shadows on the interior of the lampshade.

It is among the objects of the present invention to provide a method of manufacturing a lampshade of the kind specified which avoids the disadvantages of the above-noted methods, and to provide an apparatus for use in carrying out the method.

According to one aspect of the invention there is provided a method of manufacturing a lampshade of the kind specified from a heat-formable sheet material, comprising forming a blank of such sheet material into the form of a hollow body having upper and lower peripheral edges, temporarily holding the blank in this shape, heating a said peripheral edge of said hollow body to a temperature at which it is formable, folding said heated edge around a former to form an incompletely closed cavity or pocket extending around the respective end of the blank, allowing the material to cool, extracting said former from said cavity or pocket and subsequently inserting into said cavity or pocket a complementary part of a mounting frame.

According to another aspect of the invention there is provided apparatus for manufacturing a lampshade of the kind specified, comprising means for supporting a hollow body formed from such sheet material and having upper and lower peripheral edges, the apparatus including a former for peripheral engagement with the interior surface of said hollow body adjacent a said peripheral edge thereof, so that a marginal edge portion of said body projects beyond said former, means for heating such marginal edge portion, means for engaging said marginal edge portion after such heating and folding or rolling it around a peripheral rounded bead of said former and for holding the formed edge portion in place until the material has cooled, so that the edge portion of said material formed around said bead has the form of an incompletely closed cavity or pocket.

In the accompanying drawings:

FIGS. 1 and 2 illustrate steps in known methods of manufacture, as discussed above, and FIGS. 3 to 12 are axial section views illustrating successive stages in the manufacture of a lampshade by a method in accordance with the invention, utilising an apparatus embodying the invention.

Figure 3:
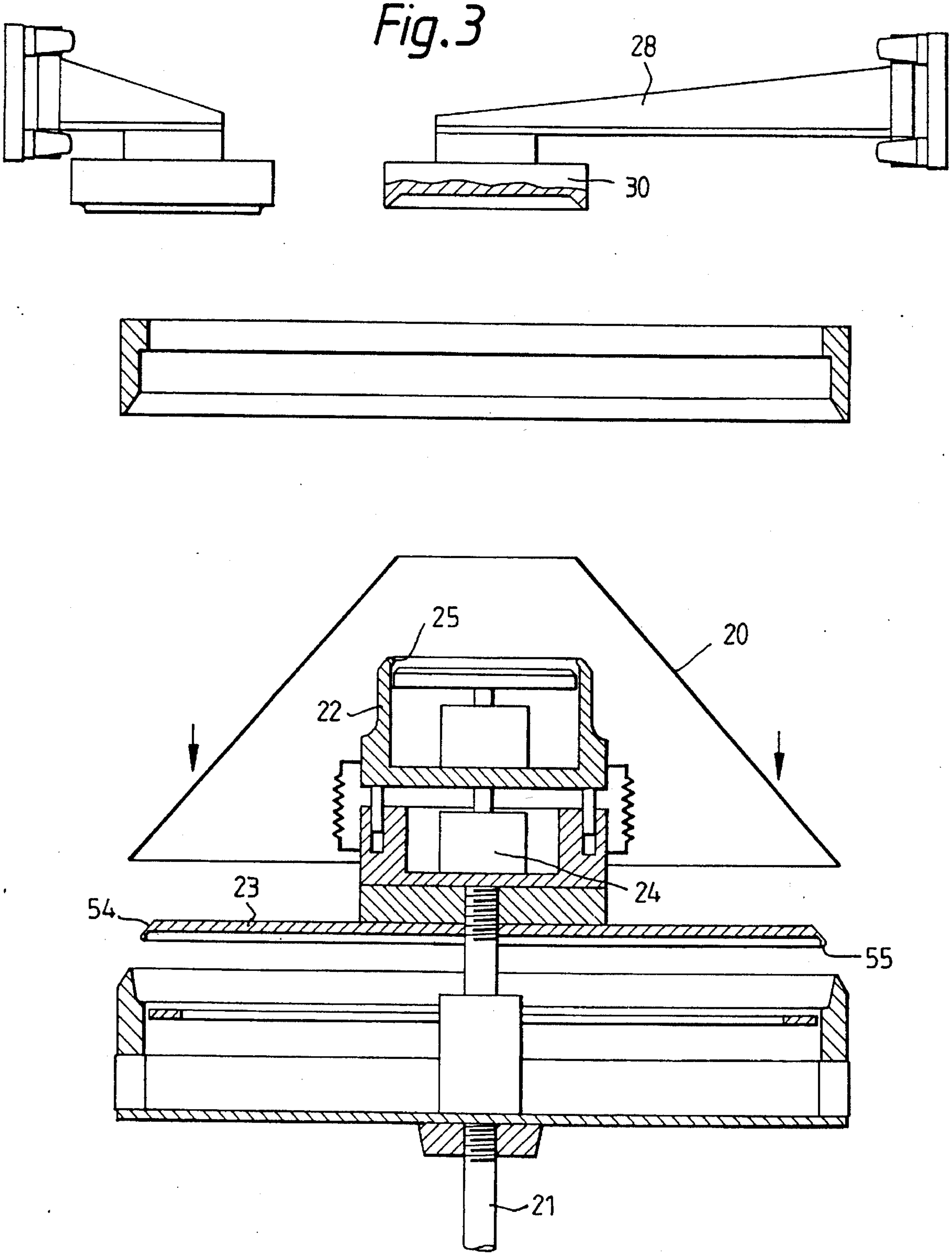

Referring to FIG. 3 onwards, the manufacture of a lampshade, using a decorative fabric having, adhered to one face thereof, a dimensionally stable flexible plastics sheeting, commences, as in conventional practice, with the cutting from such composite material, of a workpiece of the shape illustrated in FIG. 1 and described above. This workpiece is placed in a welding jig whilst being rolled into a conical configuration so that the opposite ends 12 of the workpiece overlap. The welding jig incorporates edge and end location stops such that the workpiece is held precisely in the shape of a hollow truncated cone 20 of predetermined dimensions. The overlapping edge portions are temporarily secured together by tack welds, whilst the workpiece is in the welding jig.

The intermediate product 20 thus formed, is then removed from the former and fitted into the apparatus shown in FIGS. 3 to 12. This apparatus includes an upper former 22 and a lower former 23 both generally circular in plan, the upper former being of smaller diameter than the lower former, such that in the position of the apparatus shown in FIGS. 3 and 4 the upper former can engage the interior of the truncated cone 20 adjacent the upper end of the latter whilst the lower former, located within the cone 20 adjacent the lower end thereof, is spaced only slightly from the inner surface of the cone.

Figure 4:
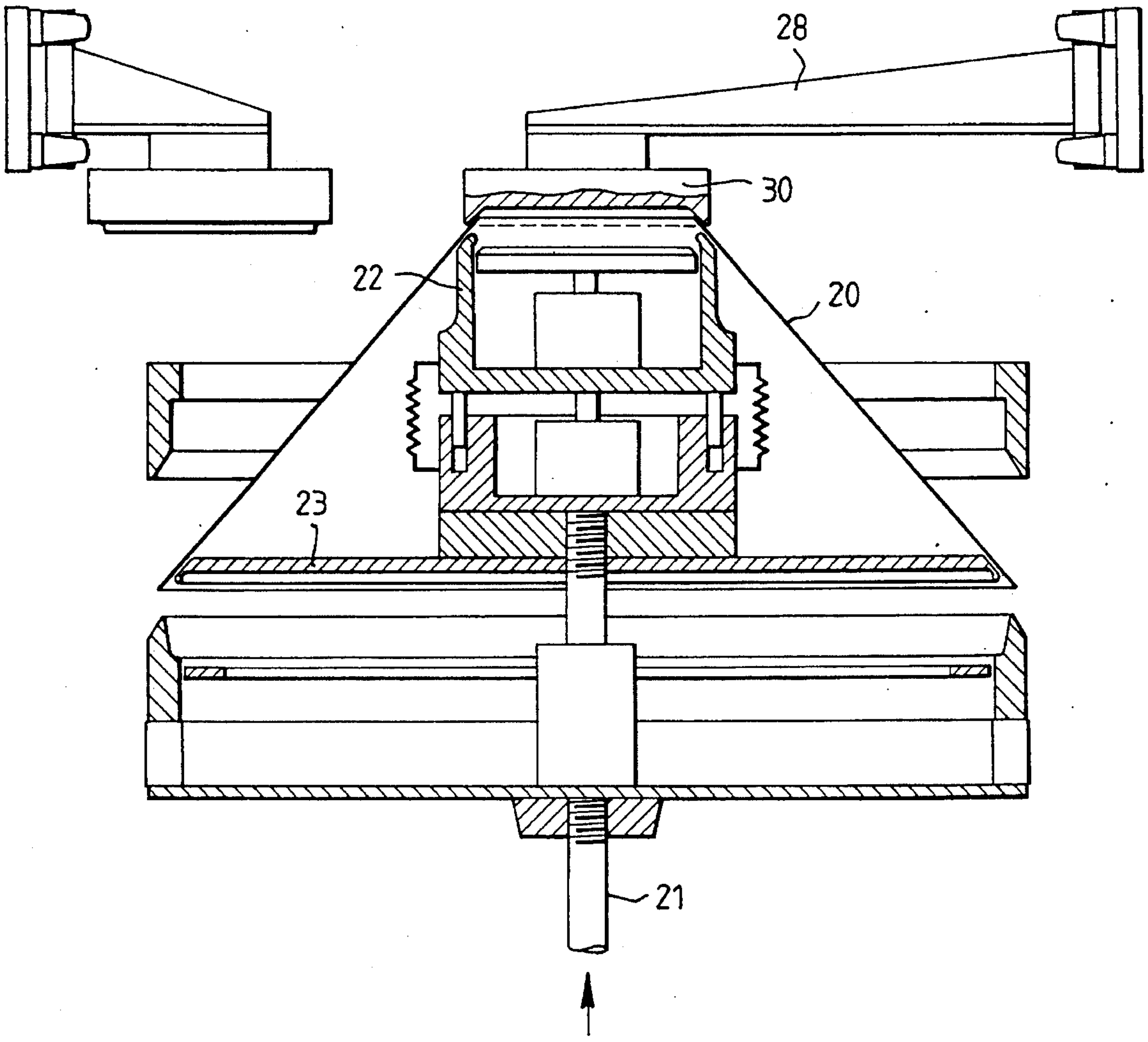

After placing the workpiece 20 in the apparatus as shown in FIG. 3, in a first stage, as indicated in FIG. 4, the upper former 22 and lower former 23, together with associated apparatus parts (see below) are raised, by an actuator 21 to raise the cone 20 into cooperation with an upper heater 30. The former 22 has the general form of an upwardly open cup with a generally cylindrical wall which, at its upper, free edge, has a radially inwardly projecting rounded lip or bead 25 (see FIG. 3). The wall of this cup is chamfered externally at its upper end so as to have a frusto-conical outwardly facing surface of the same conicity as the cone 20 and which outwardly facing surface mates with the inner surface of the cone 20 adjacent the upper end of the latter.

The heater 30 is suspended above the former 22 on a horizontally extending swinging arm 28 pivotable about a vertical axis. The heater 30 has, on its underside, a frusto-conical depression which, as the cone 20 is raised receives the projecting upper edge portion of the cone 20 and heats the same sufficiently to soften the plastics backing material and render the upper free edge portion of the cone 20 pliable and deformable. The softened upper edge portion of the workpiece 20 is deformed radially inwardly and downwardly to some extent by engagement with the contact area of heater 30.

Figure 5:
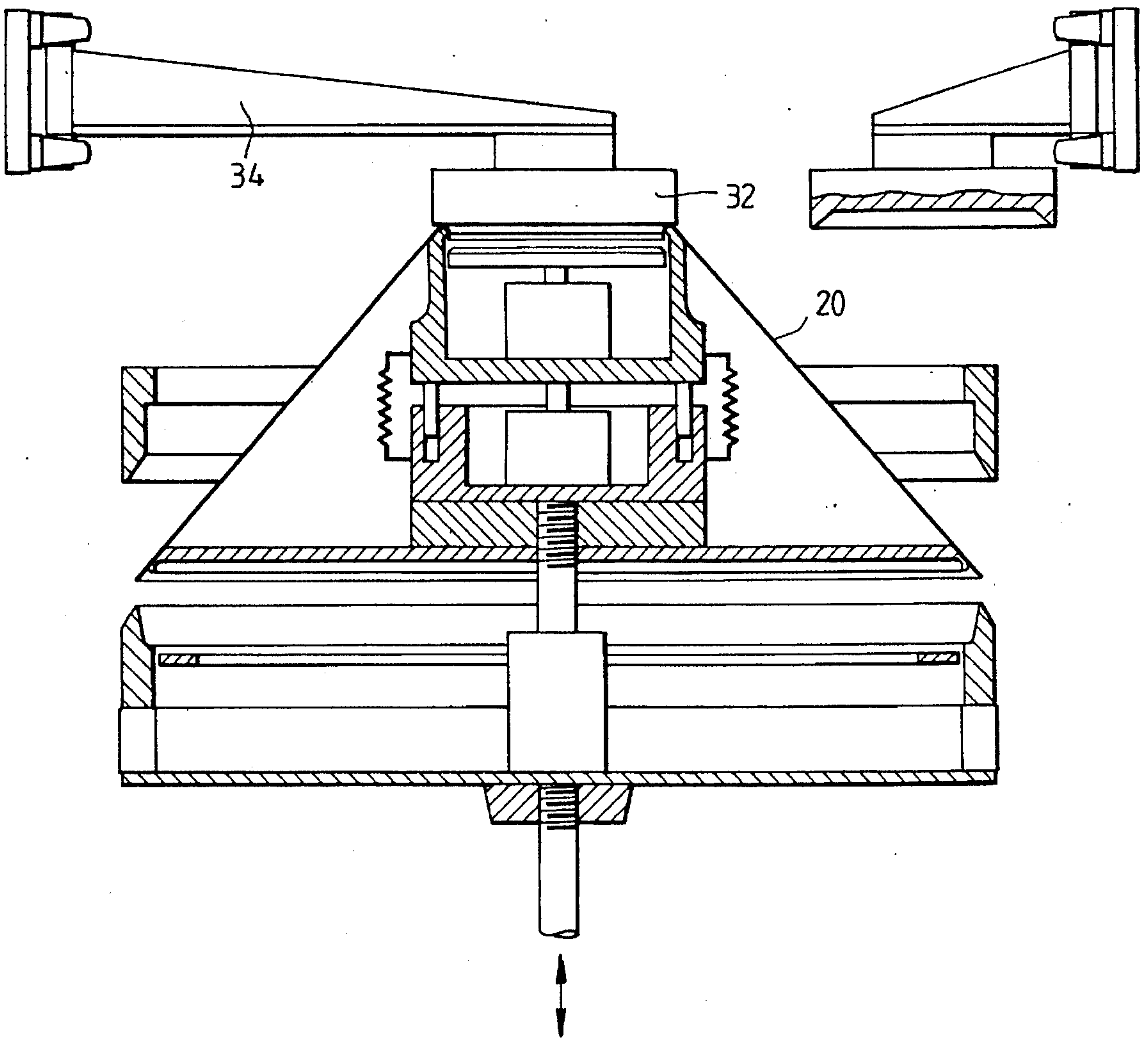

In the next stage, the cone 20, with the formers 22 and 23, is lowered slightly to allow the arm 28 to be swung away to move the heater 30 laterally away from the upper end of the workpiece 20 and a top mould 32 carried by another horizontal arm 34 pivotal about a vertical axis, to be swung into position directly above the former 22 and the upper end of the workpiece 20. The cone 20, with the formers 22 and 23 is then raised again, as illustrated in FIG. 5 to engage the top mould 32 with the upper end of the cone 20. The top mould 32, during this movement, deforms the softened upper edge portion of the workpiece downwardly over the bead 25 at the upper end of the wall of the former 22.

The top mould 32 has the general form of a cylindrical block with a vertical central axis and, on the underside of the mould 32, a shallow, circular projection which fits snugly within the upper end of the former 22. The shallow circular projection is provided by a central plug which is spring loaded into its lowermost position relative to the peripheral part of the top mould. The transition region between the central plug and the peripheral portion takes the form, in the lowermost position of the plug, of a rebate which is concave in axial section through the mould so as to be complementary with the rounded bead 25 at the upper end of the wall of former 22 and thus so as to cooperate closely with that bead. As a result, the softened upper edge portion of the blank 20 is made to fold smoothly around the rounded bead 25 at the upper end of the former 22 and to afford, within the central recess of the former 22, a downwardly depending skirt.

Figure 6:
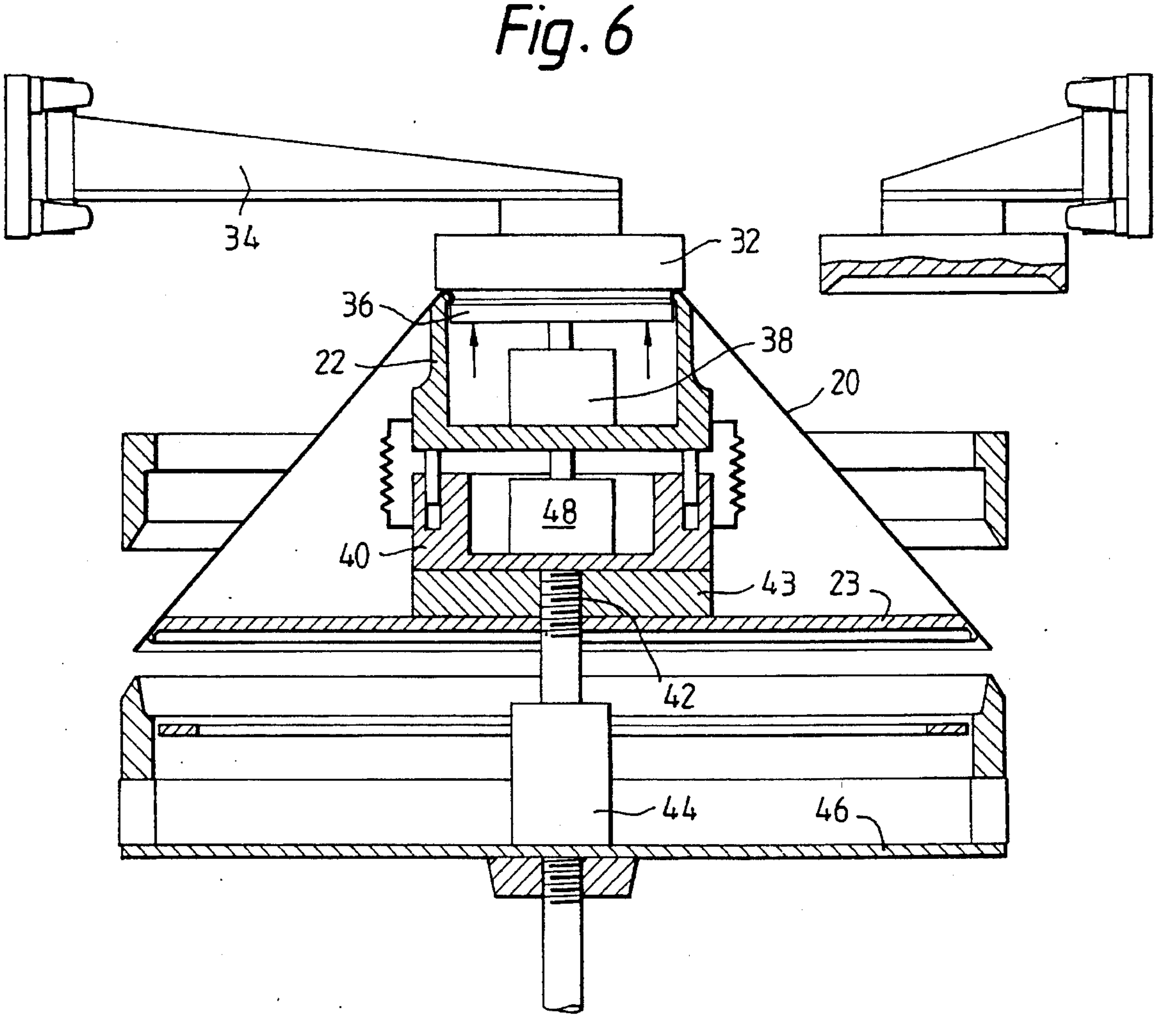
Figure 7:
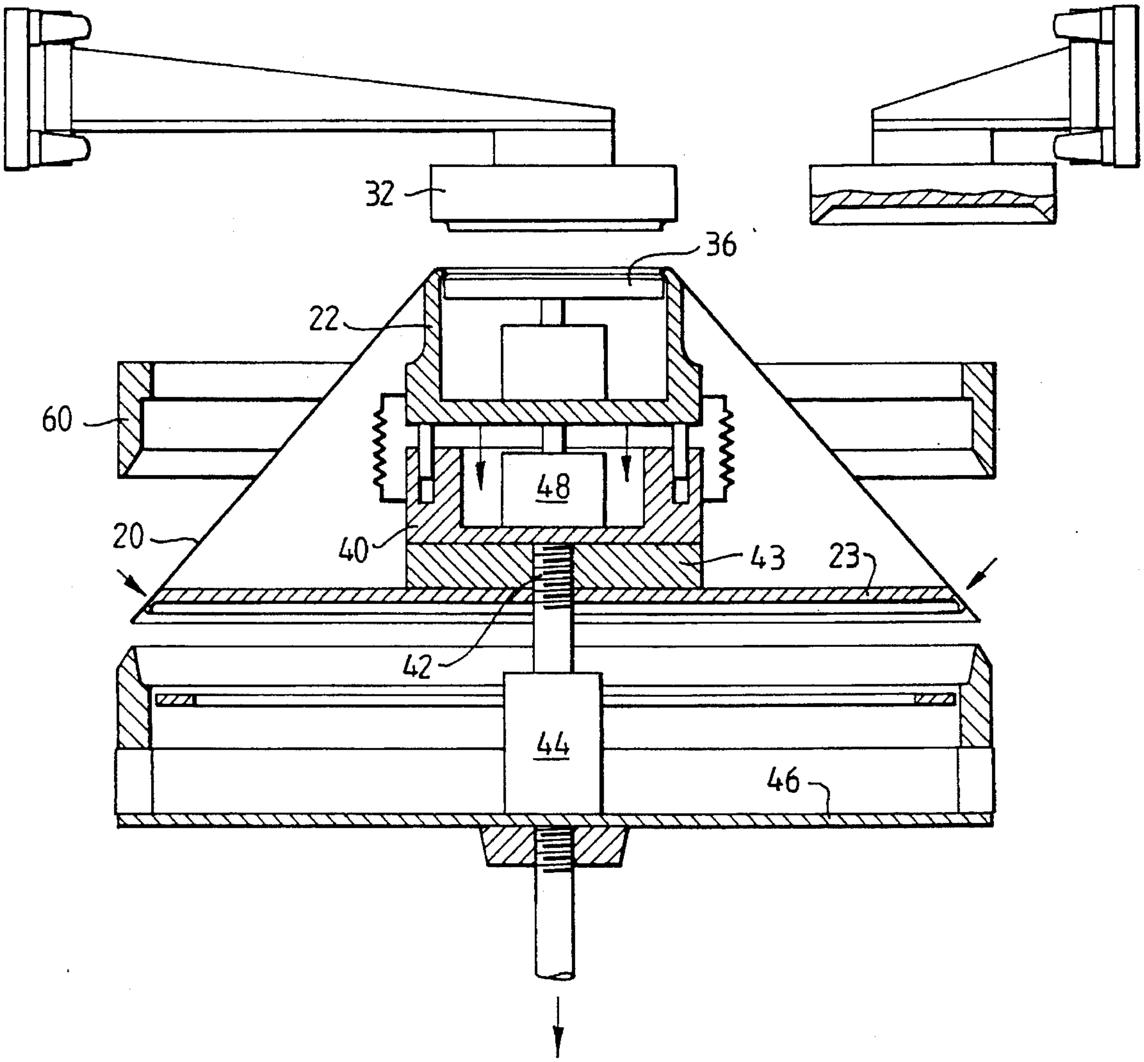

In the next stage, shown in FIG. 6, a circular clamping plate 36, vertically reciprocable within the hollow interior of the former 22 is raised by an actuator 38 so that this downwardly depending skirt of the shade material is engaged between a frusto-conical chamfered upper edge portion of the plate 36 and the inwardly and downwardly facing surface portion of the rounded bead 25 at the upper end of the former 22 and is clamped between bead 25 and the clamping plate 36. Thus, the lowermost part of the inner free edge of the fabric at the upper end of the workpiece 20 is flared radially outwardly somewhat by the plate 36. As the plate 36 is raised into its clamping position, it engages the underside of the central plug of the top mould and moves it upwardly. Thus, it is ensured that the upper part of the workpiece is kept in contact with respective parts of the apparatus during the whole of the operation by which the upper edge portion is formed or rolled. The apparatus is kept in the position shown in FIG. 6 until the material of the blank has cooled before the cone 20, with the formers 22 and 23, is lowered away from the top mould 32 as shown in FIG. 7.

Subsequently, the top mould 32 is swung to one side (see FIG. 8).

It will be noted that the former 22 is movable vertically in a support 40 carried in turn on the upper face of a spacer plate 43 mounted on the upper end of the piston rod 42 of an actuator 44, the cylinder of which is mounted in the middle of a support plate 46 of a lower heater 58, this plate 46 being, in turn, mounted at the upper end of the piston rod of the actuator 21 (not shown in full). The lower former 23 is mounted around the piston rod 42 and is secured to the underside of the spacer 43.

The former 22 is normally biased downwardly, relative to the support 40, by tension springs, indicated schematically in the drawings. During the initial stages illustrated in FIGS. 3 to 6, the former 22 is urged upwardly relative to the support 40 against the bias of these tension springs, by a further actuator 48.

In the stage illustrated in FIG. 7, the actuator 48 is de-energised so that the cone 20, still clamped by the former 22 and clamping plate 36, is drawn downwardly slightly by the tension springs so that the periphery of the lower former 23 is firmly engaged with the cone 20.

The lower former 23 has a downwardly depending frusto-conical skirt 54 (see FIG. 3) terminating in a rounded bead 55 projecting downwardly and radially inwardly relative to the vertical axis of the apparatus.

Figure 8:
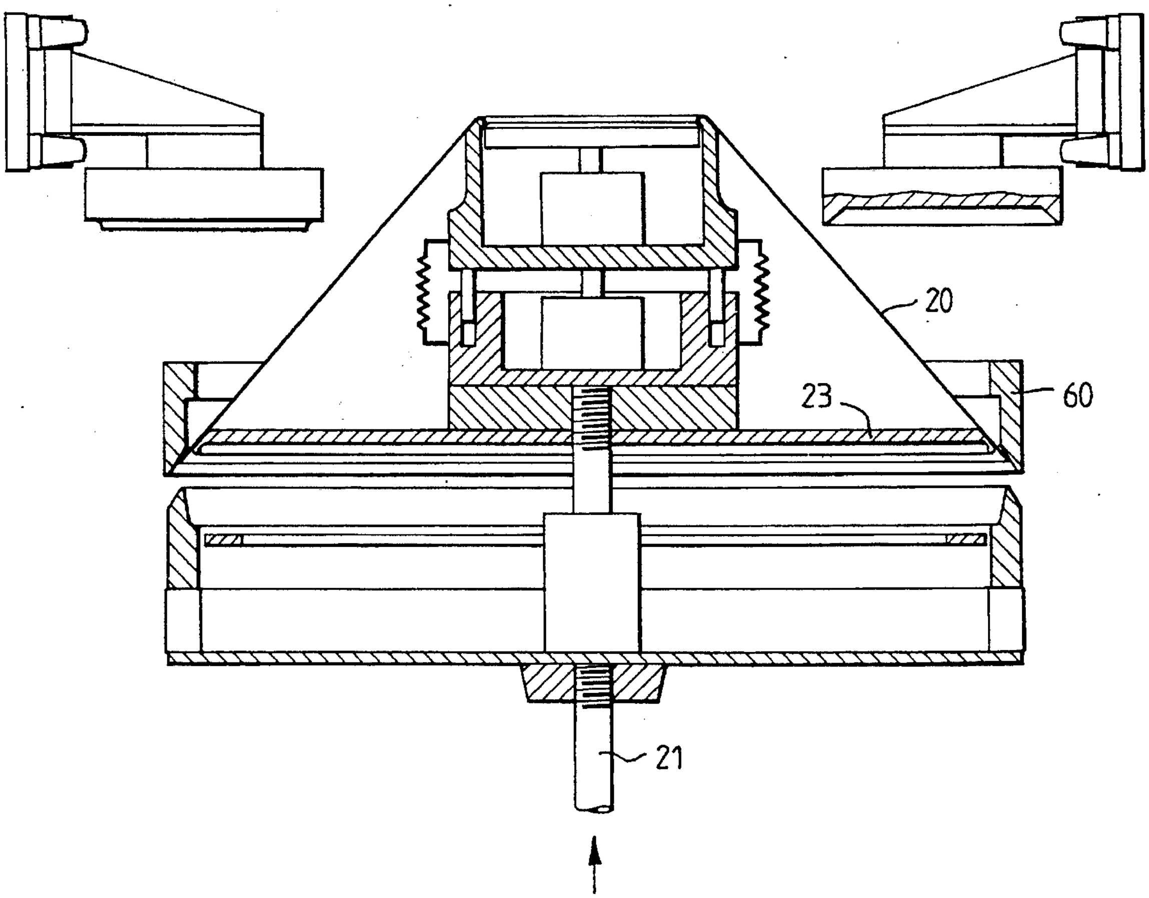
Figure 9:
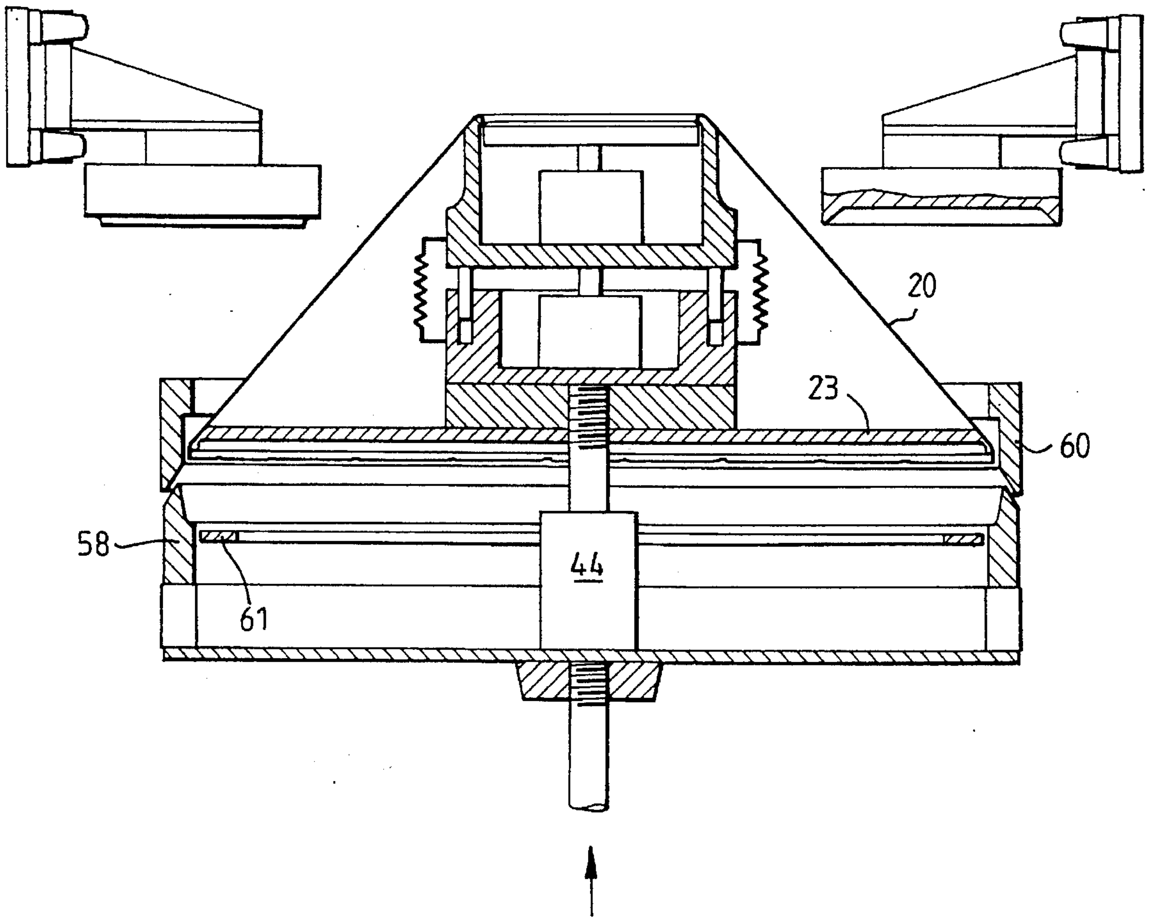

As shown in FIG. 8, with the apparatus in this condition, the rod of actuator 21 is now extended upwardly to move the lower edge of the blank 20 into cooperation with an upper heater 60 for the bottom of the blank 20. In this position, the lower edge of the cone 20 projecting downwardly below the lower former 23 is heated by the heater 60. The heater 60 has the general form of a horizontal annular ring, mounted at a vertical position which is somewhat above those occupied by the former 23 in FIGS. 3 to 7. Internally, the heater 60 has, at its lower end, where it cooperates with the projecting lower edge portion of the cone 20, a concave downwardly diverging frusto-conical surface. The heating of the projecting lower edge portion of the cone 20 by the heater 60 softens and renders deformable that lower edge portion of the fabric. Further upward movement of the assembly, including the cone 20 and former 23 relative to heater 60 moves the lower edge of the cone into a cylindrical recess within heater 60, whereby the softened lower edge of the cone is biased downwardly and inwardly as illustrated in FIG. 9.

Figure 10:
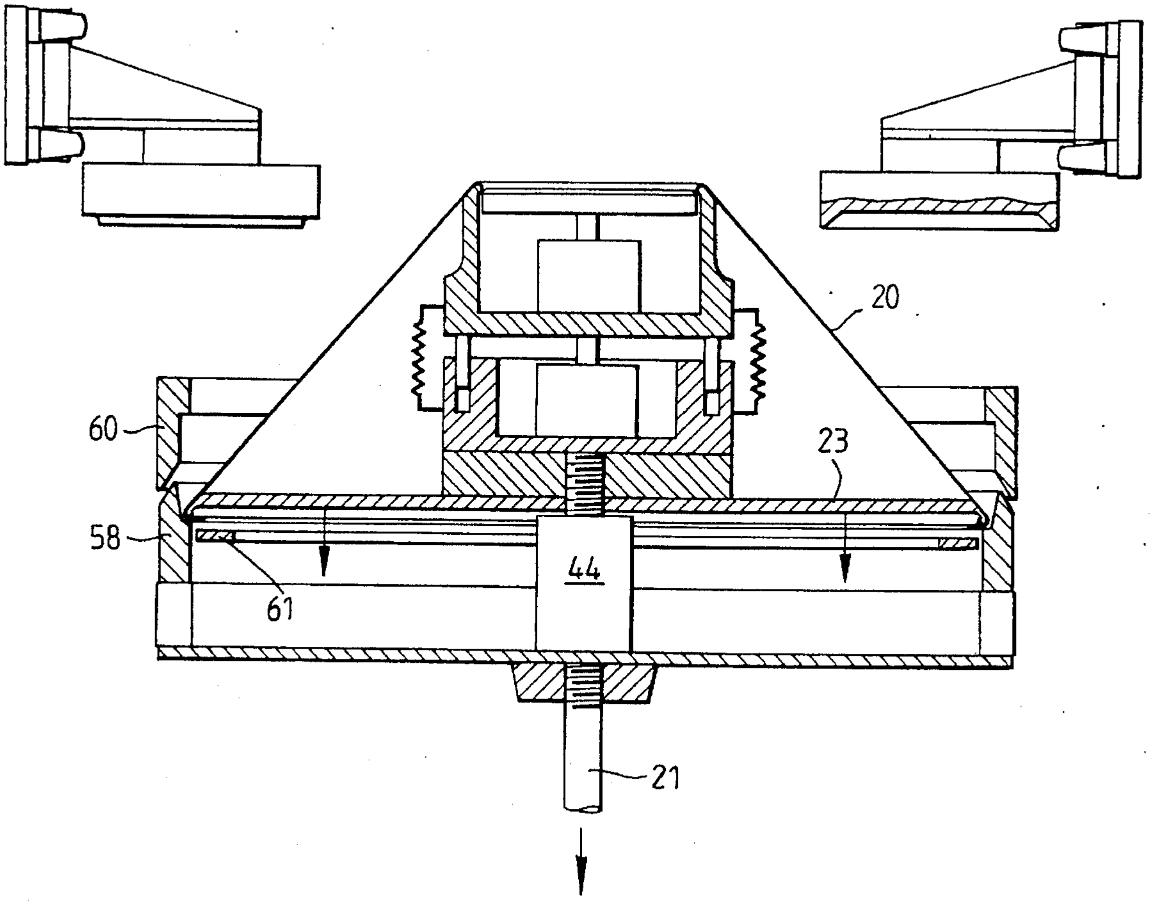

By a lowering of the assembly comprising the former 22, cone 20, support 40, lower former 23, etc. by operation of actuator 44, the softened lower edge portion of the cone 20 is brought into cooperation with a lower heater 58, as shown in FIG. 10. The lower heater 58 has a circumferential generally cylindrical wall co-axial with the formers 22 and 23. This wall has an internal rebate running around its upper free edge and comprising a generally horizontal upwardly facing ledge, an outwardly and upwardly flaring wall surface extending upwardly from said ledge and a concavely radiused transition region between the ledge and the flaring wall portion, which transition region cooperates with the rounded bead 55 at the lower end of the lower former 23, with the shade material interposed therebetween. Thus, the lower edge portion of the shade material is deflected inwardly between the bead 55 and said ledge as illustrated in FIG. 10.

Figure 11:
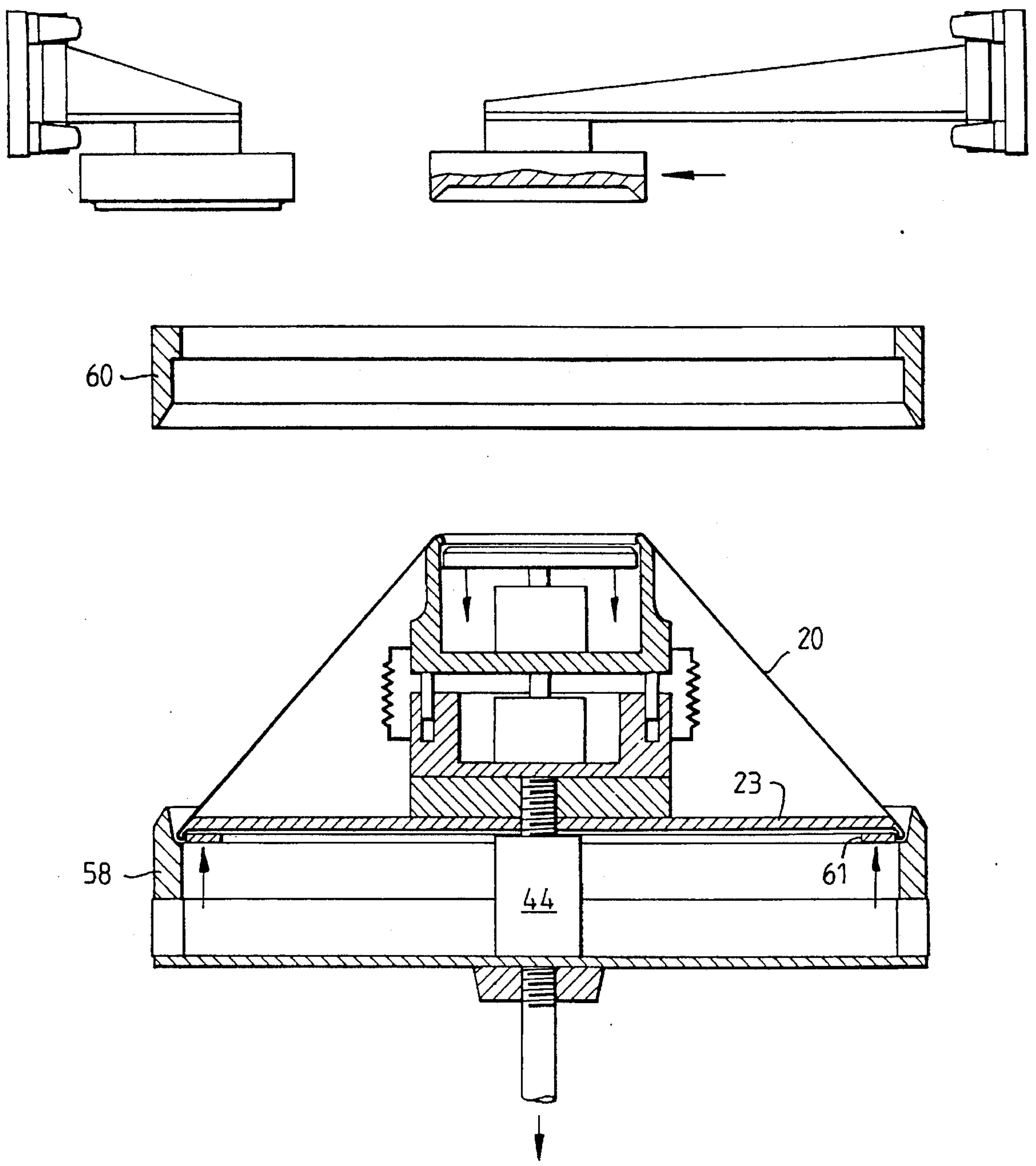
Figure 12:
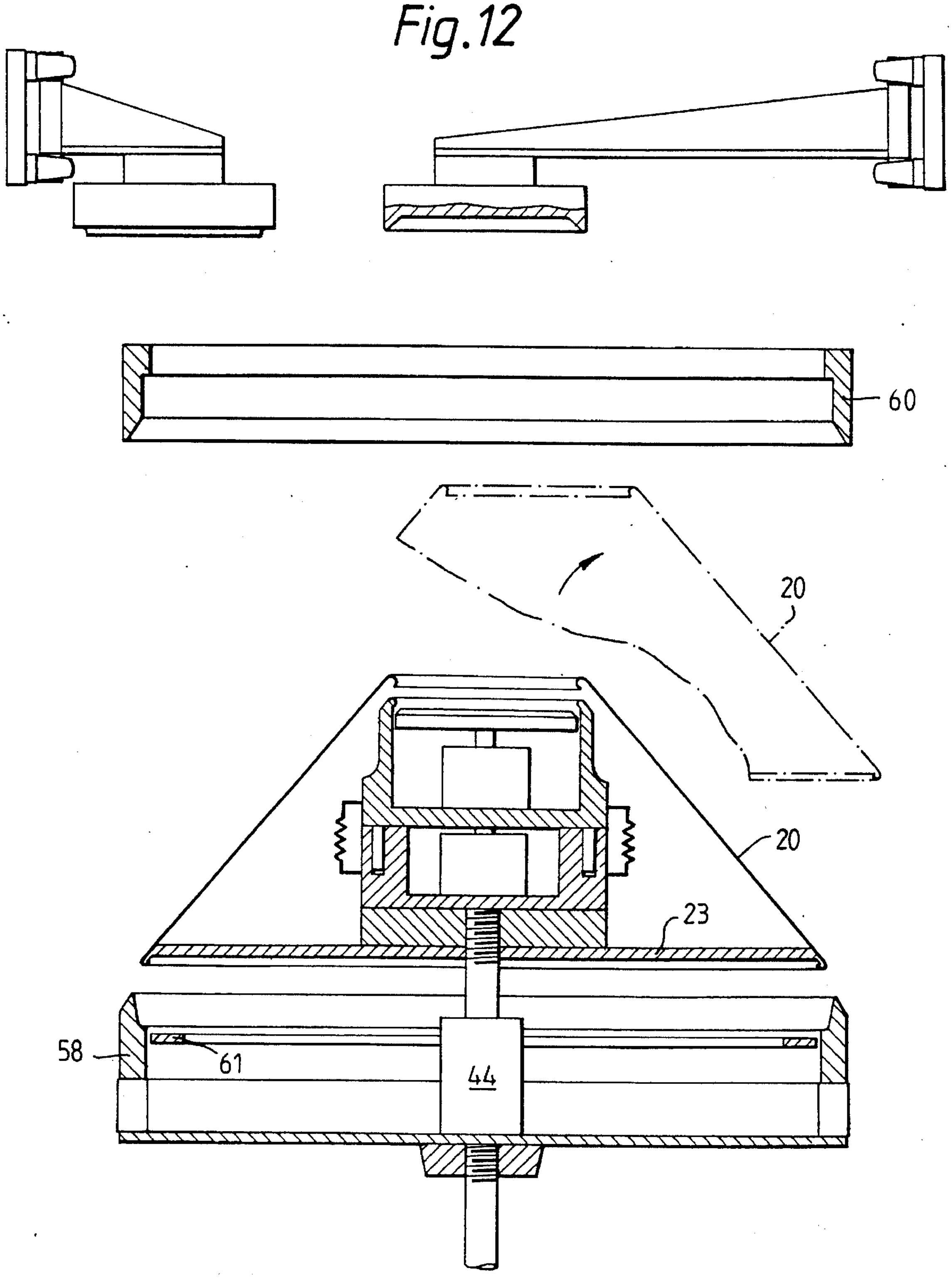

Mounted within the recess defined on the interior of the peripheral wall of the lower heater 58, by means not shown, is a former ring 61 which is now raised, by actuator means (not shown), into the recess defined radially inwardly of the bead 55 around the lower edge of the lower former 23, as shown in FIG. 11, to bring the lower edge region of the shade fully around the bead 55. The former ring 61 has a split or gap at one position around its circumference, allowing expansion of the ring 61 against a spring bias provided by its own resilience, by means of an actuator (not shown). Once the former ring 61 has been raised into the recess defined radially inwardly of the bead 45, the ring is expanded radially outwardly, by the last-mentioned actuator, to ensure that the shade material firmly engages the circumferentially inner surface of the bead 55. At the same time, (or around the same time), the assembly including formers 22, 23, cone 20 and heater 58 is moved downwards as a whole, relative to the upper heater 60, top mould 32 and top heater 30. The former ring 61 maintains its position relative to the former 23 whilst the lower heater 58 is moved downwardly relative to the lower edge of the cone 20 by extension of the actuator 44. After the lower portion of the shade material has cooled, the former ring 61 is allowed to contract and is moved downwardly and the apparatus is now in the position shown in FIG. 12 in which the now-formed blank 20 is clear of the upper and lower heaters (60, 58). The temporary connection between the adjacent edges 12 of the blank is now broken manually to allow the blank to be stripped from the upper and lower formers (22, 23) and removed from the apparatus.

The outer peripheral ring 16 of a mounting bracket such as that indicated at 14 in FIG. 2 is then pushed into the annular channel formed by the rolled over edge portion at the upper end of the shade 20 and the straight edges 12 of the shade material re-united by a permanent weld to complete the shade. Whilst it has been found that, in practice, the rolled edges of the blank 20 are sufficiently stiff to retain the required circular shape without additional stiffening, if desired, a circular stiffening ring, of for example wire, such as illustrated at 18 in FIG. 2, may be fitted within the rolled edge of the lower part of the shade.

It will be appreciated by those in the art that the relevant movement of the various parts of the apparatus between the various stages described may be effected in any desired manner, for example by combinations of movements of the actuators different from those described. By way of example, the top mould 32 could be carried on a fixed bracket at a position on the vertical axis of the apparatus, above the level occupied in FIG. 4, thereby leaving room for introduction and removal of the top heater 30, the arrangement being such that forming of the top edge of the shade would take place simultaneously with the heating of the lower edge of the shade (e.g. in the stage shown in FIGS. 8 or 9).

In a further variant, (not shown), means is provided for rolling the upper and/or lower edges of the shade material fully, i.e. so that either or each of these edges forms a fully closed torus, the material of which overlaps itself somewhat as viewed in vertical section through the shade.

It will also be appreciated that the shade material need not be plastics backed fabric but may be, for example, decorative plastics sheeting or a fabric of thermoplastics fibres.

It will also be appreciated that whilst the shade of which the manufacture is described above with reference to the drawings is generally circular in plan, and the formers 22, 23; heaters 30, 58, 60 etc. have been described as correspondingly circular, a shade could be formed by substantially the same technique, which was substantially square in plan, for example, or of some other shape, the formers and heaters, etc. being, in such a case, of course, of correspondingly square or other shape. Furthermore, the shade need not be of frusto-conical, frusto-pyramidal or other tapering shape but may be cylindrical, for example.

We claim:

1. A method of manufacturing a lampshade from a heat-formable sheet material comprising the steps of:

providing a former and support assembly including a former part centred on an axis and providing an annular peripheral bead concentric with said axis;

providing heating means operable in a region of said peripheral bead;

providing forming means associated with said former part;

forming a blank of said sheet material into the form of a hollow body having first and second peripheral edges and having other edges extending between said peripheral edges;

temporarily connecting said other edges of the blank together to hold the blank in shape;

fitting the blank onto said former and support assembly such that a first marginal edge portion of said blank projects beyond said annular peripheral bead;

producing relative movement along said axis between said former and support assembly and said heating means to bring said heating means adjacent said first marginal edge portion and heating said first marginal edge portion by said heating means;

producing relative axial movement between said former and support assembly and said forming means to fold the heated and softened said first marginal edge portion around said annular peripheral bead;

cooling said first marginal edge portion;

breaking said temporary connection of said other edges;

separating said forming means from said first marginal edge portion;

extracting said former part from the sheet material to leave a pocket in the region formerly occupied by said peripheral bead; and permanently connecting said other edges of said blank together.

2. The lampshade manufacturing method as claimed in claim 1 further including the step of inserting, into said pocket, a complementary part of a mounting frame.

3. The lampshade manufacturing method as claimed in claim 1 further including the step of rolling said first marginal edge portion into a closed toms shape.

4. The lampshade manufacturing method as claimed in claim 1 further including the step of forming said blank into a frusto-conical form prior to permanently connecting said other edges of said blank together.

5. A method of manufacturing a lampshade from a heat-formable sheet material comprising the steps of:

providing a former and support assembly including a first former part centred on an axis and having a first annular peripheral bead concentric with said axis and of a first diameter;

providing a second former part having a second peripheral annular bead at a location spaced from said first bead along said axis and of a substantially greater diameter, wherein said first and second beads face in opposite directions along said axis, and wherein said first former part is hollow and has a peripheral wall extending to an open mouth defined by said first annular bead, said peripheral wall converging conically in the direction towards said axis and away from said second annular bead, and terminating in said first annular bead;

providing first heating means operable in the region of said first peripheral bead and second heating means operable in the region of said second peripheral bead;

providing first forming means associated with said first former part;

providing second forming means associated with said second former part;

forming a blank of sheet material into the form of a hollow frusto-conical body having first and second peripheral edges providing a narrower and a wider end respectively of said body, and having other edges extending from said first peripheral edge to said second peripheral edge;

temporarily connecting regions of said other edges of the blank together to hold the blank in shape;

fitting the blank onto said former and support assembly so that a first marginal edge portion at said narrower end of the frusto-conical body projects beyond said first annular peripheral bead and a second marginal edge portion at said wider end of the frusto-conical body projects beyond said second annular peripheral bead;

producing relative movement, along said axis, between said former and support assembly and said first heating means to bring said first heating means adjacent said first marginal edge portion;

heating said first marginal edge portion by said first heating means;

producing relative axial movement between said former and support assembly and said first forming means to fold the heated and softened first marginal edge portion around said first annular peripheral bead;

producing relative axial movement between said former and support assembly and said second heating means to bring said second heating means adjacent said second marginal edge portion;

heating said second marginal edge portion by said second heating means;

producing relative axial displacement between said second forming means and said assembly to fold the heated and softened second marginal edge portion around said second annular peripheral bead;

cooling said first and second marginal edge portions;

displacing said first and second displaceable forming means away from said first and second former parts, respectively;

breaking said temporary connection of said regions of said other edges of the blank;

extracting said first and second former parts from the sheet material to leave pockets in the regions formerly occupied by said peripheral beads; and inserting, into at least one of said pockets, a complementary part of a mounting frame.

6. The lampshade manufacturing method according to claim 5 wherein said step of providing said first forming means includes:

providing an internal forming plate accommodated within said hollow first former part and encircled by said peripheral wall thereof;

providing actuating means within said hollow first former part for displacing said forming plate along said axis towards and away from the inner side of said first peripheral bead; and providing an external forming member having a central region of a size to extend into the opening defined by said first peripheral bead.

7. The lampshade manufacturing method according to claim 6 wherein said step of folding the first marginal edge portion around said first bead includes the steps of:

first producing relative axial displacement between said former and support assembly and said external forming member such that the external forming member turns said first marginal edge portion into the interior of said first former part around said first peripheral bead; and subsequently advancing said internal forming plate axially towards said first peripheral bead.to widen the free marginal part of said first marginal edge portion and clamp it against the interior surface of said peripheral wall of the first former part.

8. The lampshade manufacturing method according to claim 5 further including the steps of:

moving said second heating means axially to cooperate with said second marginal edge part of the blank material, to soften the blank material, and subsequently to push said second marginal edge part past the second former part;

retracting the second heating means axially and advancing said second annular member axially so that firstly the frusto-conical internal surface thereof engages the second marginal edge portion to urge the second marginal edge portion radially inwardly, then said ledge deforms the second marginal edge portion further that it projects radially inwardly; and moving said concentric former member axially to engage the radially inwardly projecting second marginal edge portion and turn it around said second peripheral bead and hold it against the inner surface of said second peripheral bead, wherein said second former part is in the form of a plate affording said second peripheral bead, and said second heating means comprises an annular member of a size to extend around said plate, the second heating means being movable along said axis relative to said assembly between a position closer to said first former part than said second peripheral edge and a position in which said second heating means extends around said peripheral edge, and wherein said second forming means includes a further annular member coaxial with said axis and located further from said first former part than said second former part and having a frusto-conical internal surface widening towards said second former part, and terminating remote from the second former part in an inturned ledge facing towards said second former part and, a former concentric with said second annular member and displaceable axially relative to the second annular member and said second former part.

9. The lampshade manufacturing method according to claim 5 further including the step of securing said other edges together permanently.

10. The lampshade manufacturing method according to claim 9 further including the step of inserting said complementary part of a mounting frame into said pocket before said other edges are permanently connected.

11. The lampshade manufacturing method according to claim 5 further including the step of extracting said first former part from the pocket formed by said first former part, whilst the blank is still around said first and second former parts by moving the first former part towards said second former part.

12. The lampshade manufacturing method according to claim 6 wherein said first former part is axially movable relative to said second former part and is urged axially away from said second former part by resilient biasing means, and wherein actuating means is provided operable to move said first and second former parts axially towards one another against said bias, and wherein the steps of heating said first marginal edge portion, forming said first marginal edge portion around said first peripheral bead and clamping said first marginal edge portion against said interior surface of said peripheral wall are carried out before said steps of heating and forming said second peripheral edge, and wherein, whilst said first marginal edge portion is still clamped by said internal forming plate, said actuating means is operated to move said first former part closer to said second former part and thereby to urge said second former part into engagement, via its periphery, with the interior of said hollow frusto-conical body.

13. The lampshade manufacturing method of claim 5 wherein said heat-formable sheet material comprises thermoplastics sheet material.

* * * * *

UNITED STATES PATENT AND TRADEMARK OFFICE

CERTIFICATE OF CORRECTION

PATENT NO. : 5,472,656

DATED : December 5, 1995

INVENTOR(S) : Jeremy D. Wheatley and Andrew C. Diamond

It is certified that error appears in the above-indentified patent and that said Letters Patent is hereby corrected as shown below:

Title page, section '[56] References Cited, FOREIGN PATENT DOCUMENTS', insert

--1245721 10/1960 France .
1431002 1/1966 France .
2160786 7/1973 France .
3024141 1/1982 Germany .
8017078 6/1980 Germany .
910029.1 2/1992 Germany .--.

Column 1 Line 17 "frustoconical" should read --frusto-conical--.

Claim 3 Line 56 Column 6 "toms" should read --torus--.

Claim 4 Line 59 Column 6 delete "permanently".

Signed and Sealed this

Thirtieth Day of July, 1996

*Attest:*

BRUCE LEHMAN

*Attesting Officer*

*Commissioner of Patents and Trademarks*